United States Patent
Kamiguti et al.

(10) Patent No.: US 6,468,064 B1
(45) Date of Patent: Oct. 22, 2002

(54) INJECTION MOLDING MACHINE CONTROLLER

(75) Inventors: Masao Kamiguti, Yamanashi (JP); Tatsuhiro Uchiyama, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/358,401

(22) Filed: Jul. 22, 1999

(30) Foreign Application Priority Data

Jul. 22, 1998 (JP) .......................................... 10-222395

(51) Int. Cl.[7] .............................................. B29C 45/80
(52) U.S. Cl. ...................... 425/145; 264/40.1; 425/150
(58) Field of Search .................. 425/136, 14.5, 425/149, 150, 140, 141; 264/40.1

(56) References Cited

U.S. PATENT DOCUMENTS

| | | | |
|---|---|---|---|
| 4,734,025 A | * 3/1988 | Kawamura et al. | 425/145 |
| 4,832,883 A | * 5/1989 | Kato et al. | 264/40.1 |
| 5,380,181 A | * 1/1995 | Hiraoka et al. | 425/145 |
| 5,425,906 A | * 6/1995 | Hashimoto | 264/40.1 |
| 5,683,633 A | 11/1997 | Liehr | |
| 5,720,912 A | * 2/1998 | Liehr et al. | 264/40.6 |
| 5,792,395 A | * 8/1998 | Ito et al. | 264/40.1 |
| 5,792,483 A | * 8/1998 | Siegrist et al. | 425/135 |
| 5,911,924 A | * 6/1999 | Siegrist et al. | 264/40.1 |

FOREIGN PATENT DOCUMENTS

EP 0 531 532 A1 3/1993

OTHER PUBLICATIONS

Patent Abstracts of Japan, vol. 011, No. 006 (M–551), Jan. 8, 1987 and JP 61 182913 A (Japan Steel Works Ltd.:The) Aug. 15, 1986, Abstract.
Patent Abstracts of Japan, vol. 017, No. 012 (M–1351), Jan. 11, 1993 and JP 04 241918 A (Toyo Mach & Metal Co. Ltd.), Aug. 28, 1992, Abstract.

* cited by examiner

*Primary Examiner*—Jan H. Silbaugh
*Assistant Examiner*—Emmanuel S. Luk
(74) *Attorney, Agent, or Firm*—Staas & Halsey LLP

(57) ABSTRACT

A measurement start position is set and a screw is forcedly moved from a dwell completion position up to the measurement start position to start the measurement step. Because a measurement stroke, that is, a screw movement stroke from a measurement start position up to a set measurement completion position becomes constant independently of the screw position at the time of dwell completion, the volume of resin to be measured becomes constant and it is possible to repeatedly execute stable molding not causing the weight or specific gravity of a molded product to fluctuate.

3 Claims, 3 Drawing Sheets

FIG. 2

| MEASUREMENT | BACK PRESSURE (kgf/cm2) | REVOLVING SPEED (rpm) | POSITION (mm) |
|---|---|---|---|
| FIRST STAGE | 10 | 50 | 20 |
| SECOND STAGE | 20 | 100 | 30 |
| THIRD STAGE | 30 | 50 | |

MEASUREMENT START POSITION  10.00mm
MOVING SPEED UP TO MEASUREMENT START POSITION  10.00mm/s

MEASUREMENT COMPLETION POSITION  50mm

NUMERIC KEYPAD

| 7 | 8 | 9 |
| 4 | 5 | 6 |
| 1 | 2 | 3 |
| − | 0 | INPUT |

INJECTION MOLDING MACHINE CONTROLLER

BACKGROUND OF THE INVENTION

1. Field of the Invention

The present invention relates to an injection molding machine controller, particularly to improvement of a controller for stabilizing measurement.

2. Description of the Prior Art

A conventional injection molding machine (1) compresses resin in a mold only for a set time at a predetermined dwell pressure after injection is completed (dwell step), (2) cancels the dwell pressure after the set time passes to start a measurement step in accordance with the rotation of a screw and continues the measurement step until the resin collects at the front end of an injection cylinder, and (3) retreats the screw up to a previously-set measurement completion position to complete the measurement step.

However, a screw position at the time of dwell completion is not always constant and thereby, the screw position may fluctuate. Moreover, because a dwell pressure is extremely high as compared to a set back pressure under measurement, a problem occurs that a screw rebounds and thereby retreats immediately after canceling the dwell pressure and changing the dwell step to the measurement step.

Moreover, the retreating distance due to rebound of the screw is not always constant because the distance changes depending on various factors such as degree of resin injection into a mold at the last shot and a gate sealing progress state.

Therefore, a problem occurs that a substantial measurement start position variously changes every shot, a measurement stroke, that is, the screw moving distance from the measurement start position up to a measurement completion position fluctuates, and thereby fluctuation occurs in the measurement state every shot.

The fluctuation influences the volume of a resin to be injected into a mold at the next shot and finally, causes a molding trouble such as fluctuation of the weight or specific gravity of a molded product.

Moreover, in case of some injection molding machines provided with a shut-off nozzle the measurement step is started by positively retreating a screw by a predetermined distance from a dwell completion position in order to lower the internal pressure of an injection cylinder and securely close a nozzle.

Also in this case, however, a measurement start position is set to a position retreating a predetermined distance from a previous dwell completion position. Therefore, fluctuation occurs at a final screw retreat position, that is, at a substantial measurement start position due to the fluctuation of the dwell completion position. Therefore, also in this case, a problem occurs that a measurement stroke fluctuates every shot similarly to the previous case.

Japanese Patent Application Laid-Open No. 4-241918 discloses a method for controlling an injection molding machine in which rebound of a screw caused at the time of switching from dwell step to measurement step is prevented and a measured amount of resin becomes stable.

In case of the above control method, however, the measurement stroke every shot does not resultantly become constant because the retreat of a screw is actually started from a dwell completion position and the retreat of the screw is stopped when the resin reaction acting on the screw becomes a set value or less to start measurement.

As described above, the causes are as follows: that is, because a dwell completion position itself fluctuates and moreover, the resin reaction acting on a screw after dwell is completed is changed every shot due to various factors such as degree of resin injection into a mold at the last shot and a gate sealing progress state, fluctuation occurs every shot also in the screw position when the resin reaction acting on the screw becomes a set value or less, that is, the screw position at the time of measurement start.

OBJECTS AND SUMMARY OF THE INVENTION

It is an object of the present invention to provide an injection molding machine controller capable of executing stable measurement by keeping a measurement stroke constant without being influenced by various factors such as degree of resin injection into a mold at the last shot and a gate sealing progress state.

To attain the above object, the present invention comprises measurement start position setting means for setting a measurement start position, measurement start position storing means for storing a measurement start position set by the measurement start position setting means, and measurement start position control means for starting the measurement step by moving a screw from a dwell completion position up to the measurement start position after the dwell step is completed.

Because the processing in the measurement step is executed in the screw moving range from a set measurement start position up to a measurement completion position, that is, a predetermined measurement stroke range, it is possible to execute stable measurement even if fluctuation occurs at the dwell completion position of the screw.

BRIEF DESCRIPTION OF THE DRAWINGS

The foregoing and other objects and features of the invention will become apparent from the following description of preferred embodiments of the invention with reference to the accompanying drawings, in which:

FIG. 2 is a conceptual view showing a measurement condition setting screen; and

DETAILED DESCRIPTION OF THE PREFERRED EMBODIMENTS

Figure 1:
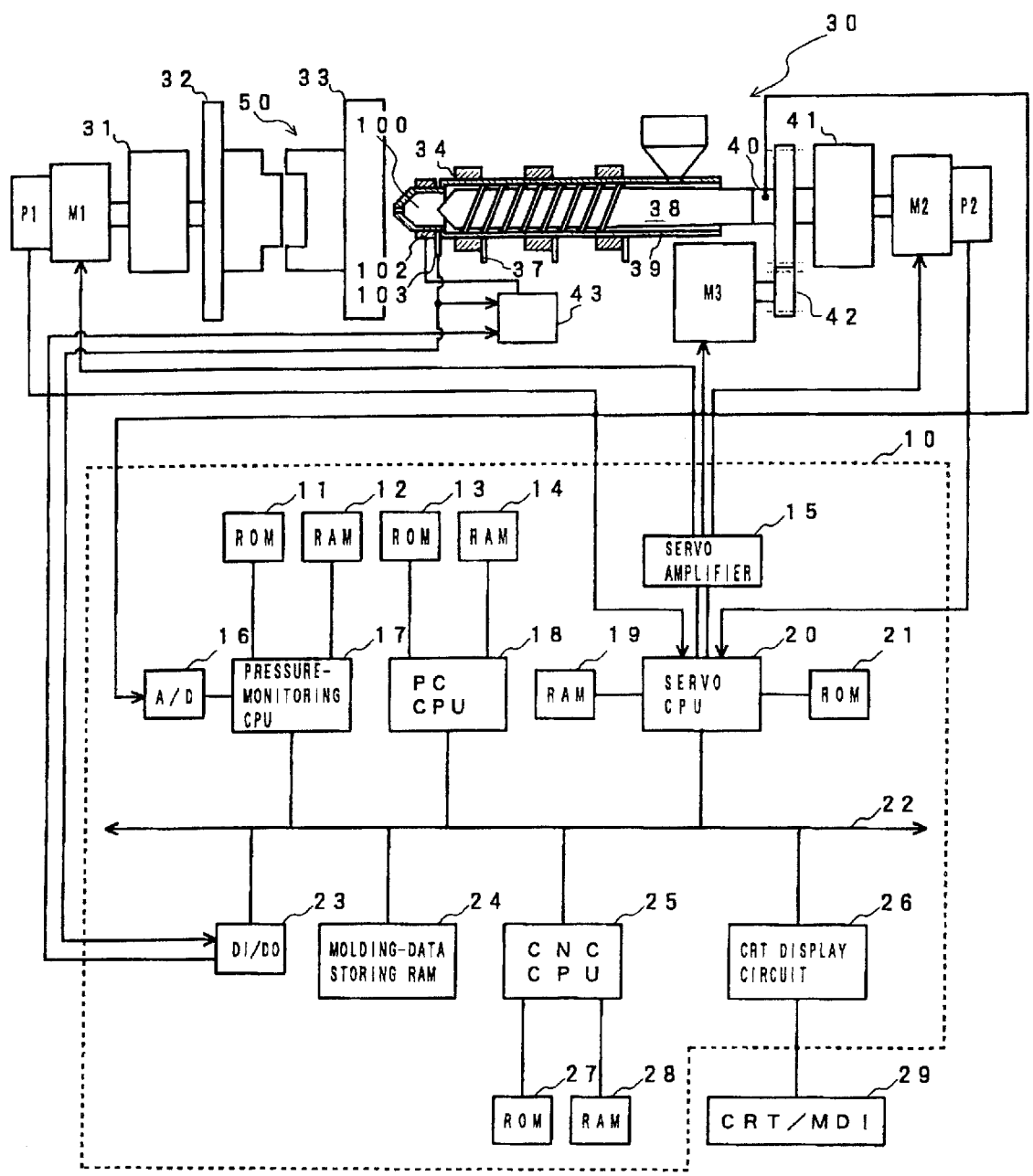
FIG. 1 is a block diagram showing an essential portion of an electric injection molding machine of an embodiment to which the present invention is applied.

FIG. 1 is a block diagram showing essential portions of an electric injection molding machine 30 of an embodiment to which the present invention is applied.

In FIG. 1, reference numeral 33 denotes a fixed platen, 32 denotes a movable platen, 39 denotes an injection cylinder, and 38 denotes a screw. The injection cylinder 39 is provided with a band heater 34 and a thermocouple 37 serving as temperature detection means.

A plurality of sets of the band heater 34 and the thermocouple 37 are provided in the injection axis direction in order to individually control the temperature of each portion of the injection cylinder 39 and a nozzle heater 102 and a thermocouple 103 are similarly provided to a nozzle 100 at the front end of the injection cylinder 39.

Though FIG. 1 shows only a thermoregulator 43 for PID(proportion, integration, and differentiation)-controlling the temperature of the nozzle heater 102 of the nozzle 100, the same thermoregulator is set to the band heater 34 and thermocouple 37 of each portion of the injection cylinder 39.

The movable platen 32 is moved by the axis output of a clamping servomotor M1 along tie bars (not illustrated) through a driving-converting unit 31 configured by a ball-nut-&-screw and a toggle mechanism.

Moreover, the screw 38 is moved by an injecting servomotor M2 in the axis direction through a driving-converting unit 41 configured by a ball-nut-&-screw and a boss-&-serration, etc., and moreover, rotated for measuring and kneading by a driving mechanism configured by a gear mechanism 42 and a measuring-rotating servomotor M3 independently of the axis-directional movement.

Moreover, reference numeral 50 denotes a mold set to the fixed platen 33 and the movable platen 32.

A controller 10 for driving and controlling an injection molding machine has a CNC CPU 25 serving as a microprocessor for numerical control, a PC CPU 18 serving as a microprocessor for a programmable controller, a servo CPU 20 serving as a microprocessor for servo control, and a pressure-monitoring CPU 17 for sampling an injection dwell pressure and a screw back-pressure so that information can be transferred between microprocessors by selecting mutual input or output through a bus 22.

The PC CPU 18 connects with a ROM 13 storing a sequence program for controlling the sequence operation of an injection molding machine and a RAM 14 used to temporarily store operation data, etc., and the CNC CPU 25 connects with a ROM 27 storing a program for generally controlling the injection molding machine and a RAM 28 used to temporarily store operation data, etc.

The servo CPU 20 connects with a ROM 21 storing a control program dedicated to servo control and a RAM 19 used to temporarily store data. The pressure-monitoring CPU 17 connects with a ROM 11 storing a control program for sampling molding data and a RAM 12 used to temporarily store data.

Moreover, the servo CPU 20 connects with a servo amplifier 15 for driving servomotors of axes for ejector, nozzle touch (not illustrated), clamping, injection, and screw rotation in accordance with the command supplied from the CPU 20 so that outputs from a pulse coder P1 (as a position or speed detector) set to the clamping servomotor M1 and a pulse coder P2 (as a position or speed detector) set to the injecting servomotor M2 are fed beck to the servo CPU 20 and the current position of the movable platen 32 computed by the servo CPU 20 in accordance with a feedback pulse supplied from the pulse coder P1 and the current position and revolving speed of the screw 38 computed in accordance with a feedback pulse supplied from the pulse coder P2 are respectively stored in the current-position storing register and current-speed storing register of the RAM 19.

The pressure-monitoring CPU 17 samples an injection pressure, dwell pressure and a screw back-pressure through a pressure detector 40 and an A/D converter 16 set to the proximal end of the screw 38.

A non-volatile memory 24 is a molding-data storing memory for storing molding conditions for injection molding (such as injection condition, dwell condition, measurement condition, and temperatures or the like of various portions of the nozzle 100 and injection cylinder 39) and various set values, parameters, and macro variables similarly to the conventional manner.

A display-provided manual data input unit 29 is connected to the bus 22 through a CRT display circuit 26 so that display of various kinds of setting screens and input of data are performed through various kinds of function keys, a numeric keypad, and cursor moving keys, etc.

FIG. 2 shows an example of a setting screen for measurement conditions. As shown in FIG. 2, in case of this embodiment, it is possible to optionally set a measurement start position and a screw moving speed from a dwell completion position to the measurement start position in accordance with the decision of an operator, and a measurement start position set through the setting screen and a screw moving speed are stored in the above non-volatile memory 24 as some of measurement conditions.

It is also preferable to fix a screw moving speed from a dwell completion position up to a measurement start position to a predetermined value instead of setting the screw moving speed each time.

As shown in FIG. 2, other measurement conditions include setting of the number of measurement stages and its change position, setting of back pressure of each stage and screw revolving speed, and setting of measurement completion position. These setting items are conventionally used and stored in the non-volatile memory 24 as measurement conditions similarly to set values of the above measurement start position and screw moving speed.

Moreover, while the PC CPU 18 performs the sequence control of each axis of an injection molding machine, the CNC CPU 25 executes distribution of movement command (such as pulse distribution) to the servomotor of each axis in accordance with the control program in the ROM 27, and the servo CPU 20 applies servo controls such as position loop control, speed loop control, and current loop control as in the past in accordance with a movement command distributed to each axis and position feedback signals and speed feedback signals detected by the detectors such as pulse coders P1 and P2 to execute the so-called digital servo processing.

Furthermore, in the injection step, the dwell step and the measurement steps, injection pressure, dwell pressures and back pressure are detected every predetermined sampling period and stored in a sampling file along time series.

Figure 3:
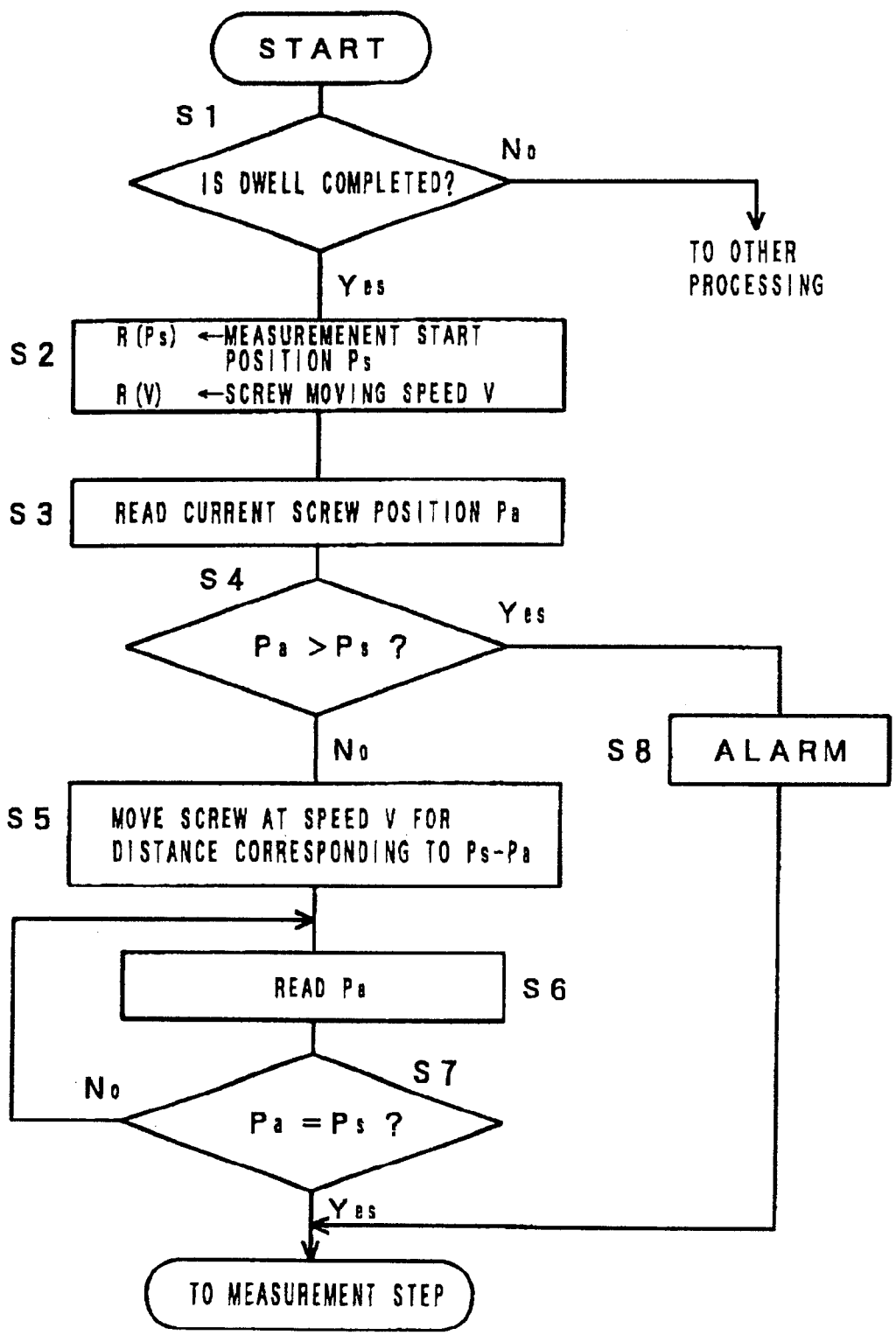
FIG. 3 is a flowchart showing a sequence processing to be executed by a CPU for PC when switching from dwell step to measurement step is executed.

FIG. 3 is a flowchart showing the outline of the processing executed to change steps from dwell to measurement in the sequence processing executed by the PC CPU 18.

Because contents of controls for mold clamping, injection, mold opening, and ejection, and processings executed in dwell and measurement steps are completely the same as the case of a conventional injection molding machine, description of portions related to them is omitted in FIG. 3.

The PC CPU 18, having detected the completion of the dwell step in accordance with a dwell completion signal supplied from the CNC CPU 25 (step S1), first stores the value Ps of a measurement start position stored in the non-volatile memory 24 as a measurement condition in a register R(Ps) and the value V of a screw moving speed from a dwell completion position to the measurement start position stored in the non-volatile memory 24 in a register R(V) (step S2).

Then, the PC CPU 18 reads the current position Pa of the screw 38, that is, a screw position immediately after the completion of the dwell step (step S3) and temporarily stores the read data in a register R(Pa) to decide whether or not a current screw position Pa retreats from the measurement start position Ps (step S4).

This embodiment uses the front end of the injection cylinder 39 as the origin of the screw 38. Therefore, the case of Pa>Ps represents that dwell is completed in the state where the current screw position Pa retreats from the measurement start position Ps.

If the current screw position Pa retreats from the measurement start position Ps and consequently, a decision result in step S4 is true (Yes), a substantial measurement stroke decreases and normal measurement may not be performed.

Therefore, in this case, the PC CPU 18 outputs an alarm signal, displays that there is a problem in the measurement step on the screen of the display-provided manual data input unit 29 to inform the problem to an operator (step S8), and allows the processing in the measurement step to be executed.

In this case, the measurement start position is not the measurement start position Ps set by the operator but the screw retreat position Pa at the time of dwell completion, as in the past. However, because injection molding can be continued, this embodiment continues molding without forcedly stopping an injection molding machine thoughtlessly from the viewpoint of the running cost or the like.

In any case, the operation for progressing the screw 38, which has retreated from the measurement start position Ps, again to return it to the measurement start position Ps must not be performed because of causing a problem such as drooling.

Moreover, when a very precise product is formed, a slight measurement error may cause a serious problem. Therefore, in this case, it is necessary to let the operator know such an error on the display through the processing in step S8 and then to cancel the processing in the measurement step, and an injection molding machine should be stopped at once.

The processing in the measurement step is the same as the conventional processing. That is, the screw 38 is rotated for measurement while supplying a set back pressure, the resin melted by the screw 38 collects at the front end of the injection cylinder 39, and the screw 38 retreats up to a set measurement completion position, then the processing in the measurement step is completed (refer to FIG. 2).

However, when the current screw position Pa at the time of dwell completion does not exceed the measurement start position Ps, that is, when the decision result in the step S4 is false (No), it is unnecessary to consider the above problem such as drooling or the like due to screw movement and moreover, it is possible to execute more stable measurement by moving the screw 38 from a screw position at the time of dwell completion, which may fluctuate every shot, up to the specified measurement start position Ps and then executing measurement at a constant stroke.

Therefore, when the decision result in step S4 becomes false, the PC CPU 18 starts retreating the screw 38 at the screw moving speed V stored in the register R(V) from the current position Pa up to the measurement start position Ps stored in the register R(Ps) (step S5), reads the current screw position Pa again (step S6), and decides whether or not the current screw position Pa reaches the measurement start position Ps (step S7).

Then, until it is confirmed that the screw 38 retreats to the measurement start position Ps, the processings in steps S6 and S7 are repeatedly executed by the PC CPU 18 similarly to the above description and the screw 38 is retreated from a dwell completion position up to the measurement start position Ps at the set screw moving speed V. As the screw 38 retreats with its speed controlled to preset value V, the screw 38 will not rebound by a large retreat or oscillation due to resin pressure, so that the screw moves at the controlled speed V up to the measurement start position Ps and is surely positioned there.

Then, when it is confirmed through the decision in step S7 that the screw 38 retreats up to the measurement start position Ps, the PC CPU 18 starts the measurement step in the same manner as in the past.

As already described, in the processing in the measurement step, the operation for rotating the screw 38 for measurement while supplying a set back pressure to collect the resin melted by the screw 38 at the front end of the injection cylinder 39 is executed as in the past. In case of this embodiment, however, no matter how the screw position at the time of dwell completion fluctuates, the measurement is always performed in a constant measurement stroke section between the preset measurement start position Ps and the measurement completion position (set value). Therefore, the volume of resin to be measured is stabilized every shot and thereby, it is possible to repeatedly execute stable molding not causing the weight or specific gravity of a molded product to fluctuate.

A case of setting a moving speed and retreating the screw 38 from a dwell completion position up to the measurement start position Ps was described above as an embodiment. However, it is also possible to set the time required for screw movement instead of setting a screw moving speed and to retreat the screw 38 by obtaining a screw moving speed in accordance with the set data.

In this case, it is necessary to read the current screw position Pa together with the measurement start position Ps through the processing in step S2 to obtain the moving distance of the screw 38 in accordance with Ps–Pa and to obtain the value of the screw moving speed V by dividing the moving distance by a preset time required.

The present invention makes it possible to execute measurement at the same measurement stroke by keeping a measurement start position constant without being influenced by fluctuation of the screw stop position at the time of dwell completion. Therefore, it is possible to repeatedly execute stable molding not causing the weight or specific gravity of a molded product to fluctuate.

What is claimed is:

1. An injection molding machine controller comprising:
    measurement start position setting means for setting a measurement start position;
    measurement start position storing means for storing the measurement start position set by the measurement start position setting means; and
    measurement start position control means for starting a measurement step by moving a screw from a dwell completion position up to the measurement start position after a dwell step is completed.

2. An injection molding machine controller according to claim 1, wherein said measurement start position control means moves the screw with a predetermined speed from the dwell completion position up to said measurement start position.

3. An injection molding machine which goes through an injection step where molten resin is injected into the mold through the nozzle by a forward movement of the screw inside the injection cylinder, a dwell step where the linear movement of the screw is kept stopped for a predetermined time at the forward movement completion position thereof while applying pressure to the resin inside the mold, and a measurement step where the screw is moved backward while melting resin material introduced by the rotation of the screw, in the order named, comprising;

measurement start position storing means for storing in advance a screw position with respect to the injection cylinder which the screw assumes when the measurement step is started;

dwell step completion detecting means for detecting completion of a dwell step;

current screw position detecting means for detecting the current position of the screw with respect to the injection cylinder;

screw retreating means for moving the screw backward with a predetermined speed until the current position of the screw detected by said current screw position detecting means comes to the position stored in advance in said measurement start position storing means, upon receiving a signal indicating detection of completion of a dwell step by said dwell step completion detecting means.

* * * * *